(12) United States Patent
Flynn et al.

(10) Patent No.: US 8,996,416 B2
(45) Date of Patent: *Mar. 31, 2015

(54) OCR ENABLED MANAGEMENT OF ACCOUNTS PAYABLE AND/OR ACCOUNTS RECEIVABLE AUDITING DATA

(75) Inventors: Joseph Flynn, San Jose, CA (US); Kerry Edward Koitzsch, Sunnyvale, CA (US); Wassim G. Jraige, Cupertino, CA (US)

(73) Assignee: Lavante, Inc., San Jose, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 13/045,388

(22) Filed: Mar. 10, 2011

(65) Prior Publication Data
US 2011/0213685 A1    Sep. 1, 2011

Related U.S. Application Data

(63) Continuation-in-part of application No. 10/349,727, filed on Jan. 22, 2003, now Pat. No. 7,908,188.

(60) Provisional application No. 60/350,543, filed on Jan. 22, 2002.

(51) Int. Cl.
*G07B 17/00* (2006.01)
*G06Q 30/04* (2012.01)
*G06Q 40/02* (2012.01)
*G06Q 40/00* (2012.01)

(52) U.S. Cl.
CPC ............... *G06Q 30/04* (2013.01); *G06Q 40/02* (2013.01); *G06Q 40/12* (2013.01)
USPC .............................................. 705/30; 705/38

(58) Field of Classification Search
USPC ....................................................... 705/30, 38
See application file for complete search history.

(56) References Cited

U.S. PATENT DOCUMENTS

| | | | |
|---|---|---|---|
| 5,210,687 A | 5/1993 | Wolfberg et al. | |
| 6,434,534 B1 | 8/2002 | Walker et al. | |
| 6,643,625 B1 | 11/2003 | Acosta et al. | |
| 6,687,677 B1 | 2/2004 | Barnard et al. | |
| 6,847,942 B1 * | 1/2005 | Land et al. ...................... | 705/30 |

(Continued)

OTHER PUBLICATIONS

Audit Solutions webpages; retrieved online Feb. 7, 2004 at url: http://web.archive.org/web/20011001105042/http://theaudit.com/ . . . , 2001, 7 pages.

(Continued)

*Primary Examiner* — Ramsey Refai
(74) *Attorney, Agent, or Firm* — Michael A. Glenn; Perkins Coie LLP (57) ABSTRACT

A number of different tags are input in a fax cover sheet that tell an OCR system not only the identity of the supplier, but also to which client the document should be routed. The OCR system identifies a number of these tags and compares them to stored supplier data to validate to which supplier the document belongs. If the system cannot validate the document, it is routed to a GUI for manual sorting. If there is no coversheet, the system relies upon the OCR system to locate keywords on the document and caller ID information to suggest a correct supplier. The OCR system also clips a separate, horizontal slice of the document ('snippet') that corresponds to the display of any line item and places it in a data base for future reference and reporting. The application collects and associates all corresponding snippets to their originating line items.

14 Claims, 7 Drawing Sheets

(56) References Cited

U.S. PATENT DOCUMENTS

| | | | |
|---|---|---|---|
| 2001/0011245 | A1 | 8/2001 | Duhon |
| 2003/0110136 | A1 | 6/2003 | Wells et al. |
| 2005/0177507 | A1* | 8/2005 | Bandych et al. ............... 705/40 |
| 2008/0208780 | A1* | 8/2008 | Hoopes et al. ................ 706/15 |
| 2009/0276669 | A1* | 11/2009 | Hoopes et al. ................ 714/746 |
| 2010/0332470 | A1* | 12/2010 | Farkash et al. ............... 707/736 |
| 2010/0332511 | A1* | 12/2010 | Stockton et al. .............. 707/759 |

OTHER PUBLICATIONS

Brochure, "Audit Solutions, Protecting Your Interests"; 1999, 7 pages.

International Search Report mailed Apr. 8, 2004 in related PCT application No. PCT/US2003/001976, 4 pages.

Jaffe, Robert; "Delayed payments raise cash without offending vendors"; Jun. 1995; Corporate Cashflow, vol. 26, Issue 6, p. 24, 3 pages; retrieved online from url: http://proquest.umi.com/pqdweb?did=6721865&sid=2&Fmt=3&clientId=19649&RQT=309&VName=PQD.

Sender, Isabelle; "Firms accrue lost dollars to chains bottom lin"; Oct. 1997; Chain Store Age, vol. 73, Issue 10, p. 196, 2 pages; retrieved online from url: http://proquest.umi.com/pqdweb?did=19677746&sid=2&Fmt=3&clientId=19649&RQT=309&VName=PQD.

White, Kathryn et al.; "Payment systems that work"; Mar./Apr. 1998; TMA Journal, vol. 18 Issue 2, p. 32, 4 pages; Atlanta; retrieved online from url: http://proquest.umi.com/pqdweb?did=27744462&sid=3&Fmt=3&clientId=19649&RQT=309&VName=PQD.

* cited by examiner

Credits

| Reference | Tx | CustNo | Credit date | Amount | Type | Location | Claim Status | Next Fax | Save & Dispose |
|---|---|---|---|---|---|---|---|---|---|
| 0781568 | | 7038930 5/24/2010 | | 3,133.30 | | NCAL | Refund | Submit | Submit By Link |
| | 10/21/10 | 10/21/10 0781568 | | CR | | | (3,133.30) | | |

Request Type: Verification — 62

Vendor ID: 562619    13494226    (3,133.30)

| Status | Type | Action Taken | Action date | Change |
|---|---|---|---|---|
| Received | | | 8/7/2010 | |

Credits — Next Fax | Save & Dispose

| Reference | Tx | CustNo | Credit date | Amount | Status | Type | Location | Claim Status | Submit | Submit By Link |
|---|---|---|---|---|---|---|---|---|---|---|
| 0781568 | | 7038930 | 5/24/2010 | 3,133.30 | | | NCAL | Refund | | |

Date    Reference    Amount    Status    Type    Supporting Details 12/15/2009   0781568   $3,133.30   ☒ Open    ☐ Overpayment   ☐ Rebate
Your Cust. No.    PO # 000468745
377450    Original Inv # _______
    ☐ Closed   Credit Memo # _______   ☐ Duplicate   ☐ Refund
     Payment # _______
     ☒ Return   ☐ Other

— 64

— 66

Please print name, sign & date

Verified by   William Satterwhite

Position   Credit Clerk

Date   08/9/10

Signature

| Verified by | William Satterwhite |
|---|---|
| Position | Credit Clerk |
| Date | 08/9/10 |
| Signature | No |

OCR ENABLED MANAGEMENT OF ACCOUNTS PAYABLE AND/OR ACCOUNTS RECEIVABLE AUDITING DATA

CROSS REFERENCE TO RELATED APPLICATIONS

This application is a continuation-in-part of U.S. patent application Ser. No. 10/349,727, filed Jan. 22, 2003, now U.S. Pat. No. 7,908,118 which application claims priority to U.S. provisional patent application Ser. No. 60/350,543, filed Jan. 22, 2002, each of which is incorporated herein in its entirety by this reference thereto.

BACKGROUND OF THE INVENTION

1. Technical Field

The invention relates to managing accounts payable and/or accounts receivable auditing data. More particularly, the invention relates to OCR enabled management of accounts payable and/or accounts receivable auditing data.

2. Description of the Background Art

The practice of performing recovery audits originated in the early 1970's, during a time of increased commerce for the retail industry. A growing network of national chain stores led to a rise in competition for retail shelf space from different suppliers. Large companies had a difficult time keeping track of the many different vendor price points, rebates, and other various discounts.

Keeping track of such details was not an integral part of purchasing departments. Such oversights led to a substantial amount of lost revenue going unnoticed in the form of duplicate payments, overpayments, missed shipments, unused credits, and other transactional errors between a company and its suppliers.

Accounts Payable Audit

Today, in a typical accounts payable (NP) audit, auditors work with the NP records of a company in an attempt to find potentially profitable discrepancies in a vendor transaction file for the company or individual business units of the company. Although much of an A/P audit can be performed at a third party location, the NP audit generally requires the cooperation and time of individuals within the client-organization to work in conjunction with the auditors. The A/P audit is a useful tool but can be time consuming for the client, However, typical A/P auditing firms are unable to do a thorough job of reviewing vendor data.

Statement Audit

Another type of audit emerging within the auditing industry is a statement audit (SA). An SA is initiated from the vendors' records and, thus, requires little, if any, intrusion within the client-company. Once vendor files are secured, the auditing company begins the process of searching for gaps, differences, and discrepancies that result in the client-company losing revenue.

An SA deals directly with suppliers and vendors. However, if performed properly, an SA yields findings that an NP audit could miss. Because of the unique nature of an SA, the SA can either stand alone or function alongside typical NP recovery efforts.

An SA is very labor intensive because the SA audit requires the requesting, receiving, organizing, and following up with vendors on auditing data from many sources. In some statement audits, the number of sources ranges in the tens of thousands of sources. Due to the labor intensive demands of an SA, very few NP auditing firms in the NP auditing industry, if any, have the capability of doing a thorough and complete job for their clients.

Prior art statement audits fail to manage credits based on line item data or on a line item basis. Instead, prior art statement audits attempt to manage credits based only on statement level data, which is not as detailed as line item data. Prior art statement audits typically only deal with open line items. Prior art statement audits put each open line item in a file and then record a note for each open line item indicating that the open line item should be checked at some point in the future. In addition, prior art statement audits only keep track of claims. Prior art statement audits fail to keep track of every line item of a client, e.g. both Debits and Credits.

Transactional Errors

There is no accepted way to predict the success of an audit. However, a general rule of thumb is that transactional errors occur with a frequency of about {fraction (1/10)} of 1%. That translates to a million dollars of annual recovery for every billion dollars of a company's annual revenue.

The A/P auditing industry is growing in size and stature as third party NP auditing firms attempt to recover lost profits for their clients. However, since NP auditing firms are unable to do a thorough job of reviewing vendor data, clients have employed internal auditors in order to recover lost profits via a statement audit. However, clients typically are unable to perform statement audits because they do not have the amount of staff necessary to perform a statement audit. Therefore, a method and system of managing accounts payable auditing data is needed.

Managing Accounts Payable Auditing Data

U.S. patent application Ser. No. 10/349,727, filed Jan. 22, 2003, and incorporated herein in its entirety by this reference thereto, discloses a method and system of managing accounts payable auditing data, where the auditing data includes at least one line item and is ordered by a propensity to yield claims. The method and system, in an exemplary embodiment, includes (1) displaying at least one aged line item, (2) identifying credit data among the at least one displayed aged line item, and (3) recording the identified credit data. In an exemplary embodiment, the aged line item is a line item that has aged for N months, where N is positive integer. In an exemplary embodiment, N is 4.

The displaying includes (a) prompting if there are any line items that are aged line items that have to be validated and deducted, (b) displaying the number of vendors, by rank, that have and have not responded and a status assigned to those vendors, and (c) allowing for the noting and aging for follow up of when the vendor promises a fax, a callback, a mailing of an item, or a check request and when a client puts a claim on hold.

The recording includes (a) allowing for the entry of contact data for at least one vendor, (b) allowing for entry of information about a vendor statement associated with the vendor, (c) allowing for selection of information about credits/claims, credits, or claims of the vendor, (d) allowing for the interaction with the information about the credits/claims, the credits, or the clams of the vendor, and (e) allowing for the entry of comments about the recording.

The statement recovery auditing disclosed in U.S. patent application Ser. No. 10/349,727 is based on a process of collecting a high volume of data that is located on hard copy documentation. This documentation resides in the accounting records of various audit system suppliers or audit system clients' customers. For purposes of simplification of explanation, but not of limitation, the discussion herein focuses on how the process works, for any one client and any one supplier.

Collecting this documentation poses a number of challenges. For example, it is preferred to get fresh documentation from each supplier at least four times a year. If the client has 15,000 suppliers, then it is necessary to request, receive, and review as many as 60,000 documents. In addition to the large amount of documentation involved, also challenging is the fact that each supplier may have different formats in which they deliver the information. Lastly, the suppliers typically do not have any electronic medium for providing the documentation and they therefore prefer to mail or fax the documentation in hard copy.

To address these issues, it would be advantageous to provide an application that not only manages tens of thousands of outreaches to suppliers, but that also can receive and perform an initial review of the responses.

SUMMARY OF THE INVENTION

An embodiment of the invention provides an application that not only manages tens of thousands of outreaches to suppliers, but that also can receive and perform an initial review of the responses. In one embodiment, an OCR system is used to receive a document and route it through the system. In most cases, a faxing agency is provided with a cover sheet to use when sending information to the system. A number of different tags are input in the cover sheet that tell the system not only the identity of the supplier, but also to which client the document should be routed. Some of the tags used are provided by the customer, such as a "Supplier Number" and "Supplier Name," while others are system generated, i.e. a "Universal ID." There are also tags that are collected that are actual document meta data elements including, but not limited to, number of pages, received date, and Caller ID of the fax sender. In any case, the OCR system is used to identify a number of these tags and compare them to stored supplier data within the system to validate to which supplier the document belongs. If the system cannot be 100% sure where the document goes, the document is turned over to a GUI for manually sorting. If there is no coversheet, the system relies upon the OCR system to locate keywords on the document and caller ID information to suggest a correct supplier.

Additionally, the OCR system also clips a separate small horizontal slice of the document that corresponds to the display of any line item, including both Credits and Debits, and places it in a data base for future reference and reporting. This clip is referred to as a snippet Because each targeted line item identified receives a unique identifier it is possible for the application to collect and associate all corresponding snippets to their originating line items.

Line items are then sent to the GUI supported by link to the originating document and links to the corresponding snippet. Also of these line items can be graphically flagged or highlighted.

DETAILED DESCRIPTION OF THE INVENTION

An embodiment of the invention provides an application that not only manages tens of thousands of outreaches to suppliers, but that also can receive and perform an initial review of the responses. In a presently preferred embodiment, this solution makes use of an Optical Character Recognition (OCR) system. The following discussion provides a brief summary of the basic functions and functionality that an exemplary OCR system performs. Each process is described in connection with a corresponding flow chart of FIG. 1-5. Also, it is important to understand that different OCR techniques are used at different times throughout the process. Many of the OCR tasks are performed simultaneously, and some are performed independently. It should be appreciated that some of these processes can be performed sequentially, and some are performed on-demand.

A presently preferred embodiment of the invention is employed in conjunction with a computer-implemented method and system that comprises the steps of managing, for example, accounts payable data of a client and/or AR data of a Supplier. In the case of accounts payable data, such data can include at least one line item; displaying an aged line item from among the at least one line item, wherein the at least one line item relates to a request from a vendor for payment on an account for the client; identifying credit data among the at least one displayed aged line item, wherein the credit data relates to a deduction that the client can take against the requested payment; and recording the identified credit data, wherein one or more of the managing, displaying, identifying and recording steps are implemented by the computer, as disclosed in U.S. patent application, Ser. No. 10/349,727, filed Jan. 22, 2003, and incorporated herein in its entirety by this reference thereto. Those skilled in the art will appreciate that the invention finds application with other methods and systems and that the invention is not limited to this exemplary method and system. For example, but not limitation, the invention may be applied to managing and reconciling debits on the statements as well. Thus, the invention is concerned both with collecting and reporting credits that are due to Clients and collecting and reporting on Debits as well. Accordingly, both Accounts Payable data of the clients and Accounts Receivable data of the Supplier are subject matter for the invention.

Further, a key aspect of the invention is to identify and report on discrepancies between the AP records of the Clients and the AR data of the Suppliers. In theory the Clients AP and the Suppliers AR records should match but, in practice, they do not. Thus, the invention is applicable to both sets of data.

Figure 1:
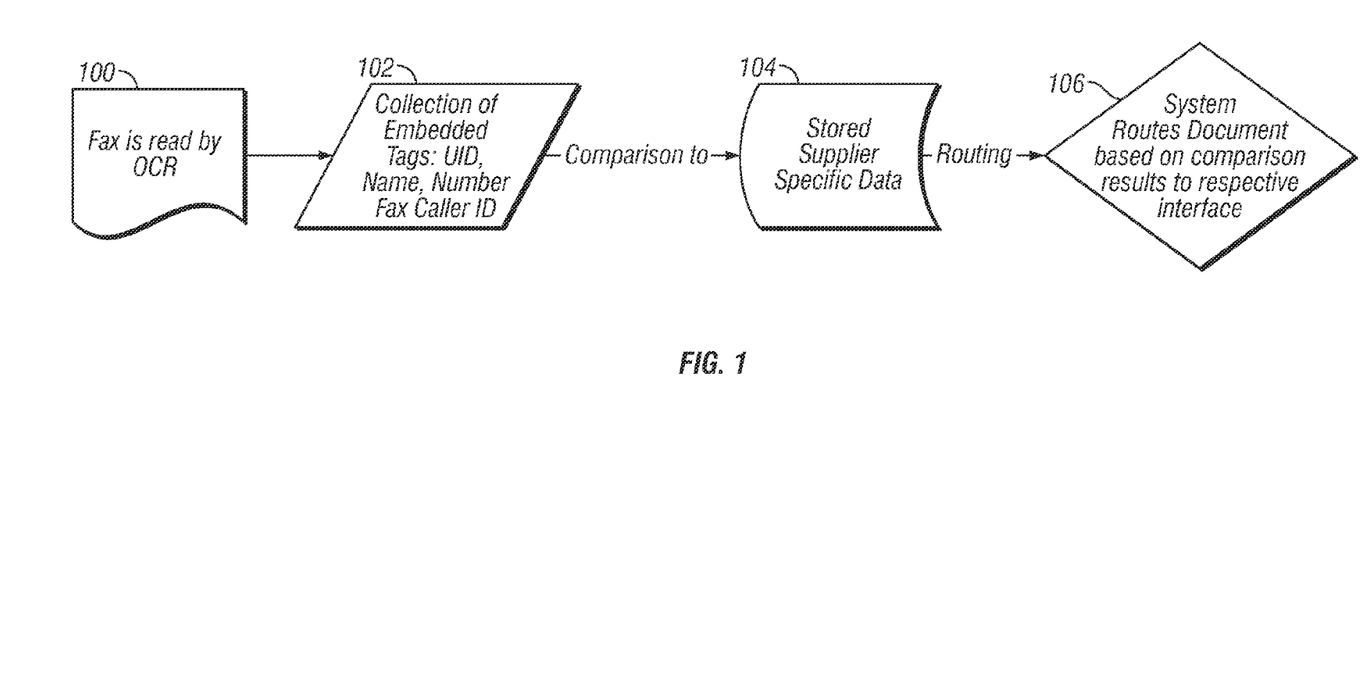
FIG. 1 is a flow diagram showing the use of an OCR system to receive a document and route it through the system according to the invention.

FIG. 1 is a flow diagram showing the use of an OCR system (100) to receive a document and route it through the system. In most cases, a faxing agency is provided with a cover sheet to use when sending information to the system. A number of different tags are input in the cover sheet that tell the system not only the identity of the supplier, but also to which client the document should be routed (102). Some of the tags used are provided by the customer, such as a "Supplier Number" and "Supplier Name," while others are system generated, i.e. a "Universal ID." In any case, the OCR system is used to identify a number of these tags and compare them to stored supplier data within the system (104) to validate to which supplier the document belongs (106). If the system cannot be 100% sure where the document goes, the document is turned over to a GUI for manually sorting. If there is no coversheet, the system relies upon the OCR system to locate keywords on the document and caller ID information to suggest a correct supplier.

There are typically two types of coversheets in use: those that are specifically created and provided to the suppliers for use, i.e. proprietary coversheets, and everything else. If the suppliers use the provided coversheet, then the system can readily find the necessary tags, etc. Also, there are many times that the supplier's unique coversheet is received and then they send the provided coversheet as well. In this case, all pages of a fax are scanned looking for the tags that indicate a provided coversheet is scanned. Even if the provided coversheet comes as the last page of a 50 page fax, the system still knows there is a coversheet.

If the supplier does not send the provided coversheet in the fax, the system still scans the supplier's coversheet to identify logos or company names, and also to match the caller ID of the sender to the supplier, etc.

Figure 2:
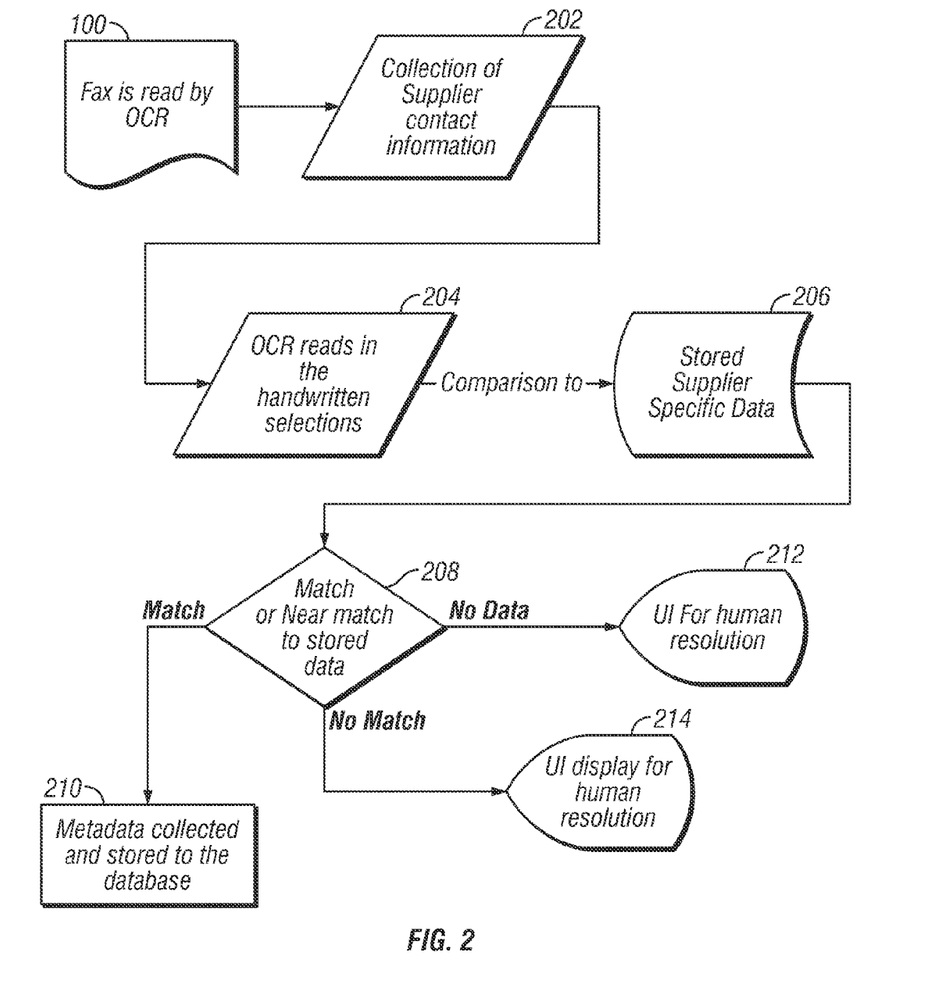
FIG. 2 is a flow diagram showing the use of cover sheets that have areas to input data by hand according to the invention.

FIG. 2 is a flow diagram showing the use of cover sheets that have areas to input data by hand. This embodiment of the invention uses OCR handwriting recognition to identify this data and store it into a database.

Example: Supplier Contact data

When a fax is received, a first consideration in an embodiment of the invention is the preparation of, and modifications to, such received documents to bring them into the application. This preparation includes, for example, cleaning the document by de-speckling the images, as well as removing any vertical lines that show up in faxes. Additionally, the system cleans up the text. Further, the system adjusts the alignment and rotation of the pages. In a presently preferred embodiment, these actions are performed for all pages all of the time.

After the fax is received (and prepared as discussed above) (100) the supplier's identity is established. The OCR system finds the area where the Supplier has entered their contact information: name, phone, fax or email, for example (102). The OCR system recognizes the handwriting (204) and then compares what it sees to what is currently in the database for that supplier. (206) If there is currently no data in the database (208), the OCR enters what it sees and serves it to a user in a GUI to verify the OCR accuracy (212). If there currently is data in the database, the OCR system compares what it is identified from the document and decides if the data is the same (208). If it is determined that the contact information is the same (210), then the OCR system notes the metadata accordingly, e.g. date, time, etc. If the data is deemed different (208), then the OCR results and the preexisting system data are sent to a GUI for human verification (214).

Any of a number of methods can be used to recognize handwriting. Each method cleans the string, then compares the string and, ultimately, rates the string. In one embodiment, the system starts by using the Hidden Markov Model (HMM) to determine a Maximum Likelihood Estimation. When this model finishes, it determines that is not likely enough, then the system moves onto the next method, such as the Mean Squared Error MSE model.

Figure 3:
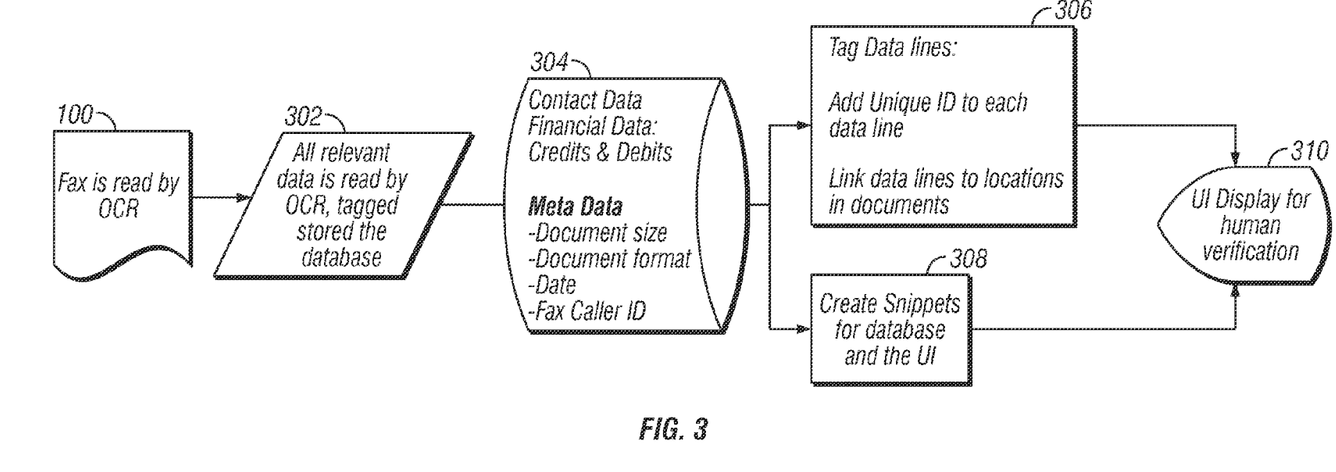
FIG. 3 is a flow diagram showing the use of OCR functionality where documents are examined and relevant data is placed into various databases according to the invention.

FIG. 3 is a flow diagram showing the use of OCR functionality where documents are examined (100) and relevant data is placed into various databases (302). In this embodiment, data is tagged back to the document and snippets are created. In this example, a document is received and the OCR system determines if the there is any data that needs to be collected into the database for review (304). In many cases, the data collected takes the form of lines of financial data provided in the form of hard copy print outs from financial systems. The OCR system identifies any financial tables on the page and automatically reads the column headers and compares them to the headers in a table master. Then, the OCR system scans through the entirety of the document, places all the targeted line items into the database, and marks them on the document within the GUI. The OCR system then tags the location of each targeted line back to its original location in the document for fast future connectivity and recall (306).

Additionally, the OCR system also clips a separate small horizontal slice of the document that corresponds to the display of any line item and places it in a data base for future reference and reporting (308). This clip is referred to as a snippet. Because each targeted line item identified receives a unique identifier it is possible for the application to collect and associate all corresponding snippets to their originating line items.

Snippets can be created for all lines of data at any time. Thus, it is possible to allow any user, e.g. client, supplier, etc., to create different types of snippets on-demand within the GUI. The snippets described herein are specific and are generated by JAVA based programming. Snippets are regional, sub images of the original document. Borders are determined by line heights and by location of the black pixels. This is why the pre-treating and cleaning of faxes is important. The system is able to recognize white space and then continue to constrict its focus until it identifies a black pixel. Once a black pixel is identified, the system follows the rules of the JAVA program to determine what is snippet-ed. It should be appreciated that a snippet can be vertical in nature as well, and not always horizontal.

Line items are then sent to the GUI (310) supported by link to the originating document and links to the corresponding snippet. Also of these line items can be graphically flagged or highlighted.

Figure 4:
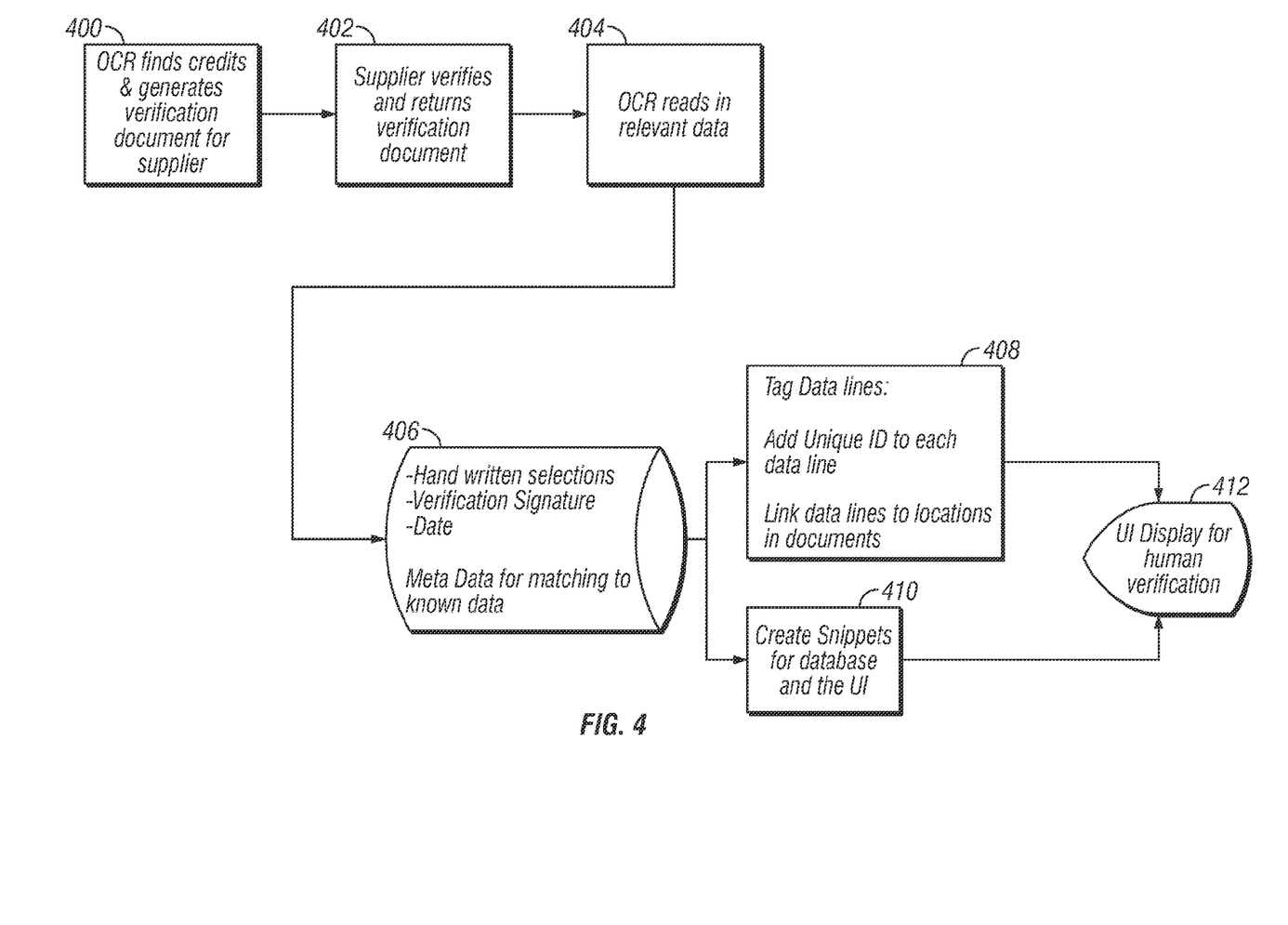
FIG. 4 is a flow diagram showing an embodiment in which verification documents are processed by the OCR system.

FIG. 4 is a flow diagram showing an embodiment in which verification documents are processed by the OCR system. Many line items require additional supporting documentation from the supplier and thus require a follow up contact and request for information. This request is automatically generated by the system (400) and can ask a number of follow up questions, including a request for a signature. The document that is sent out for this purpose is not only a form, but it is also intended to be used as a cover sheet. It can contain many of the same tags, as well as additional tags as discussed in FIG. 1. The document may contain a series of questions for the entity that correspond to each line item. The supplier verifies and returns the document (402). When the document is received, the OCR system reviews the document (404) and performs a number of tasks (406).

As described above, the OCR system tags where the respective follow-up information is located for each line item within the document (408). Additionally, the system creates a horizontal or vertical snippet for the information and associates it to the line item within the database (410). As mentioned above, the system also collects a signature at the bottom of the page. A separate snippet is created for the signature and offered as part of the backup for any line item With the creation of the follow-up snippet, signature snippet, and the snippet from the original document it is possible to deliver line item information within a GUI, complete with images from any and all related documents (412). The system also provides links back to the area and page on the originating document.

Figure 5:
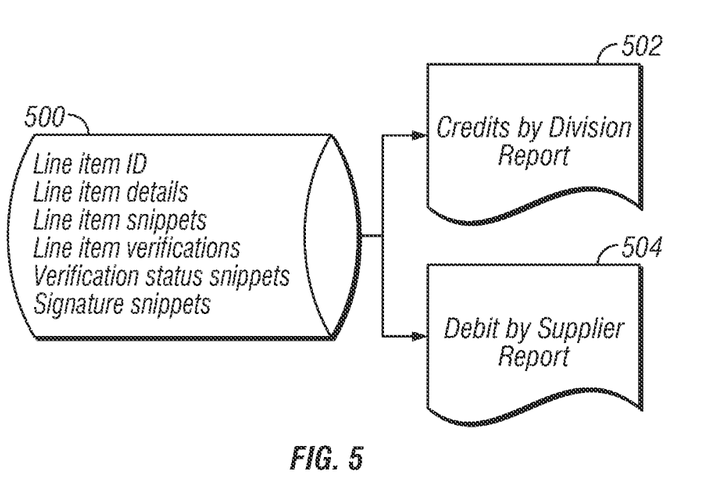
FIG. 5 is a flow diagram showing delivery of data from the database with the corresponding snippets and links to one or more reporting interfaces according to the invention.

FIG. 5 is a flow diagram showing delivery of data from the database (500) with the corresponding snippets and links to one or more reporting interfaces (502/504).

Figure 6:
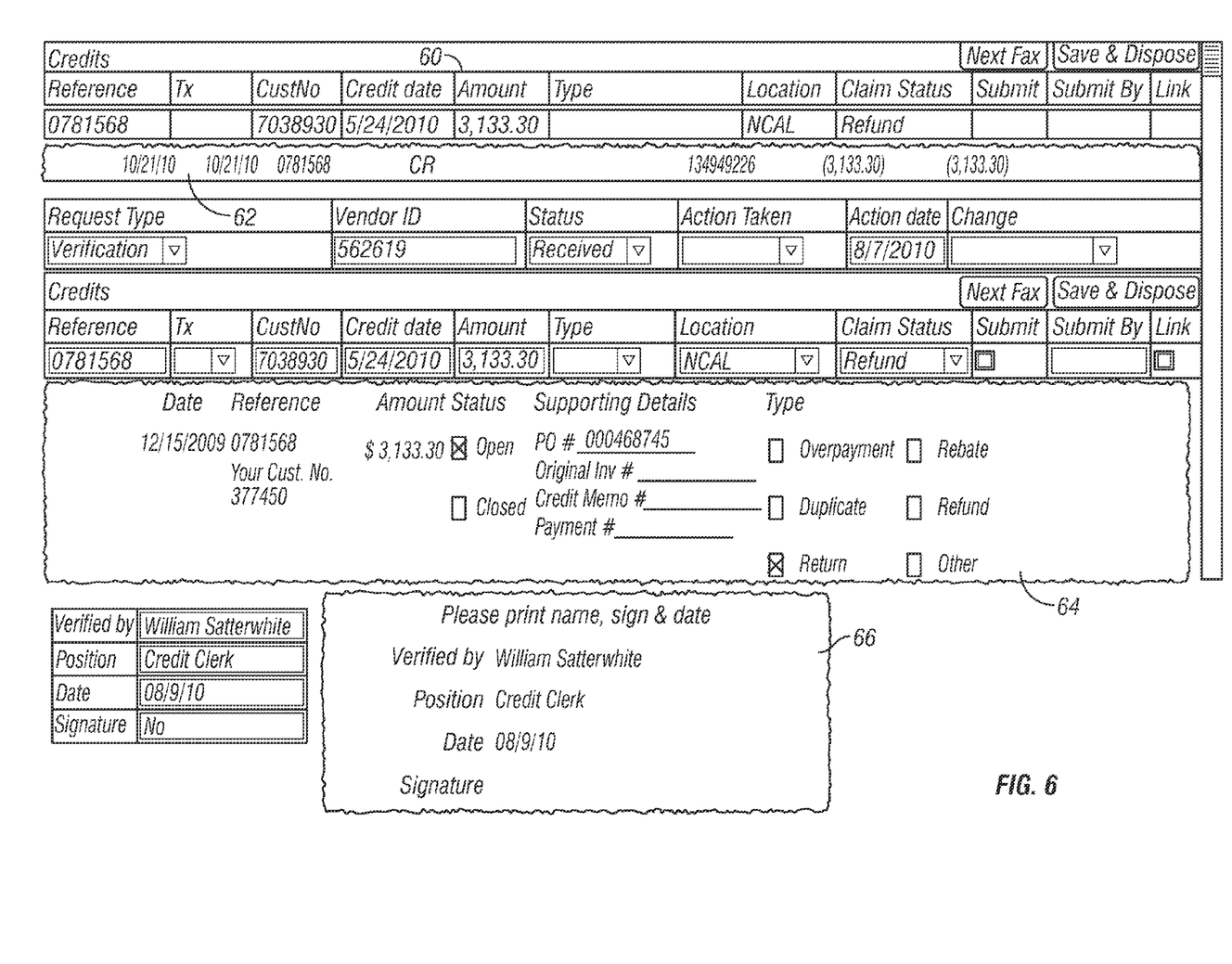
FIG. 6 is a screen display showing an example of a report according to the invention.

FIG. 6 is a screen display showing an example of a report. In this case, in addition to the report data itself 60, some details are displayed from the originating document 62, combined with follow-up data 64 and a signature 66, as snippet images from the respective original documents.

Computer Implementation

Figure 7:
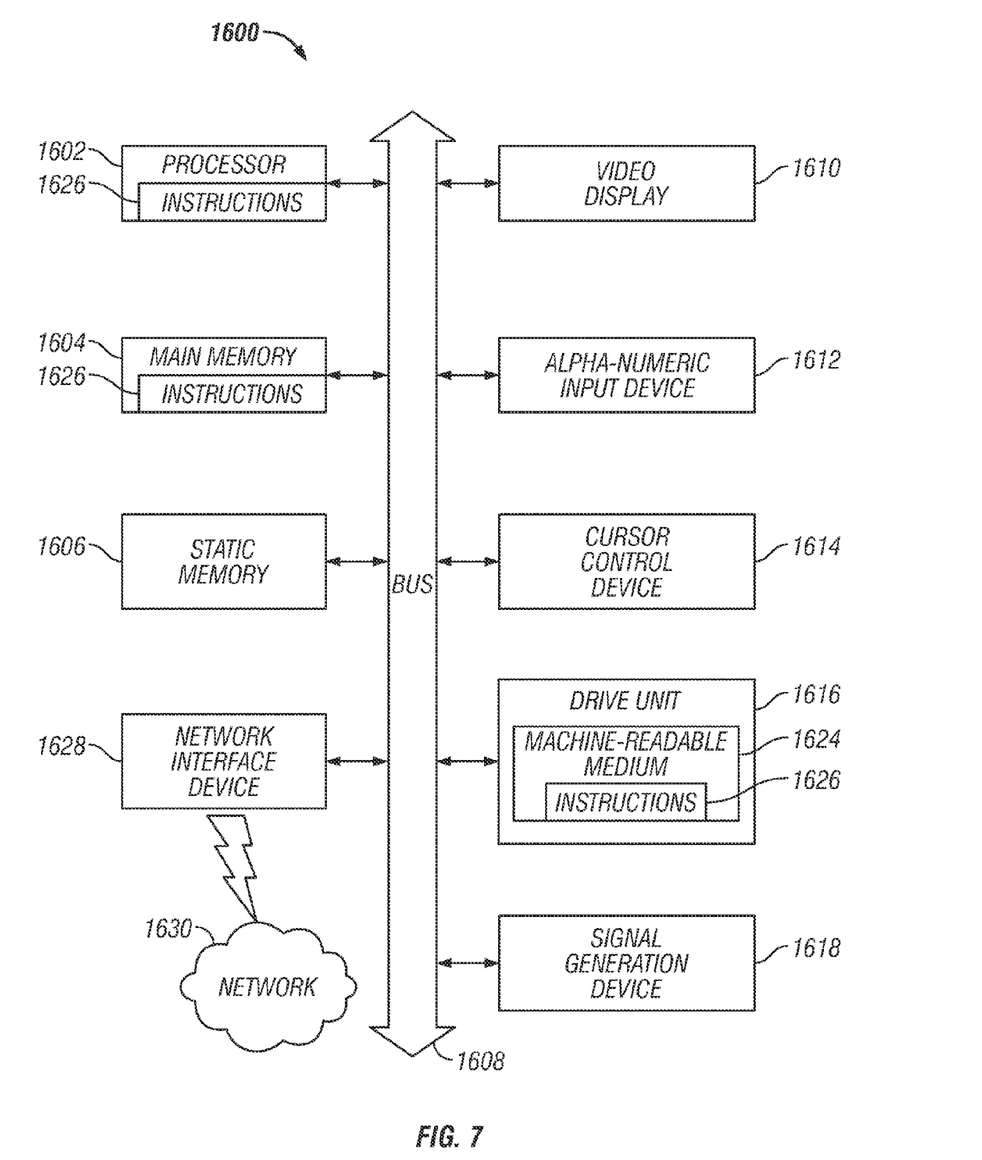
FIG. 7 is a block schematic diagram of a machine in the exemplary form of a computer system within which a set of instructions for causing the machine to perform any one of the foregoing embodiment of the invention may be executed.

FIG. 7 is a block schematic diagram of a machine in the exemplary form of a computer system 1600 within which a set of instructions for causing the machine to perform any one of the foregoing embodiment of the invention may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e., software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with complementary metal oxide semiconductor (CMOS), transistor-transistor logic (TTL), very large systems integration (VLSI), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. For example, while fax technology is discussed in connection with the preferred embodiment of the invention, those skilled in the art will appreciate that the invention is applicable to a document provided in any input medium including, but not limited to, paper documents, email messages, database records, voice, video, and image data, and information-bearing signals, as well as, without limitation, documents uploaded by a user (client, supplier, etc.). A further embodiment supports Clients AP departments want to take AR ledgers that are received from suppliers in fax format and have them delivered to the clients in, for example, an Excel format. In this embodiment, a provider receives AR ledger information from suppliers, converts them into database formats, and submits the converted data back to the clients. Accordingly, the invention should only be limited by the Claims included below.

The invention claimed is:

1. An apparatus, comprising:
a computer implemented system for management of accounts payable auditing data; and
an OCR system, in communication with said system for management of accounts payable and/or accounts receivable auditing data, said OCR system configured to receive a document comprising a plurality of different tags in a first portion thereof;
wherein said OCR system identifies a plurality of said tags and compares said identified tags to supplier data stored in a database to validate said document;
wherein said OCR system is configured to clip a portion of the document that corresponds to a line item and to place said clipped portion in said database;
wherein said OCR system is configured to collect and associate all corresponding clipped portions with their originating line items;
wherein said OCR system is configured to identify any tables in said document, automatically read column headers in said tables, and compare said column headers to headers in a table master;
wherein said OCR system is configured to scan through an entirety of said document, place all targeted line items into said database, and mark said line items on a document within a GUI;
wherein said OCR system is configured to tag a location of each targeted line back to its original location in said document; and
wherein said line items are sent to said GUI, supported by link to an originating document and links to a corresponding clipped portion of said document.

2. The apparatus of claim 1, wherein if the OCR system cannot validate the document, the document is routed to a GUI for manual sorting.

3. The apparatus of claim 1, wherein said OCR system is configured to locate keywords on the document and caller ID information to suggest a correct supplier if there is no document coversheet.

4. The apparatus of claim 1, wherein said OCR system is configured to find an area of said document where said supplier has entered contact information.

5. The apparatus of claim 4, wherein said OCR system is configured to recognize handwritten contact information and compare said handwritten contact information to contact information for said supplier stored in a database;
- wherein if there is currently no data in the database, then the OCR system enters said recognized handwritten contact information and forwards said recognized handwritten contact information to a user in a GUI to verify said OCR system accuracy;
- wherein if there currently is data in the database, then the OCR system compares it with said recognized handwritten contact information from the document and determines if there is a match;
- wherein if it is determined that there is a match, then the OCR system notes metadata accordingly; and
- wherein if it is determined that there is not a match, then the recognized handwritten contact information from the document and the data in the database are both sent to a GUI for human verification.

6. The apparatus of claim 1, wherein said OCR system is configured to automatically generate a verification request.

7. The apparatus of claim 1, wherein said computer implemented system for management of accounts payable and/or accounts receivable auditing data comprises a module for:
- managing accounts payable and/or account receivable data of a client, the accounts payable and/or account receivable data including at least one line item.

8. The apparatus of claim 7, further comprising modules for:
- displaying an aged line item from among the at least one line item, wherein the at least one line item relates to a request from a vendor for payment on an account for the client;
- identifying credit data among the at least one displayed aged line item, wherein the credit data relates to a deduction that the client can take against the requested payment; and
- recording the identified credit data, wherein one or more of the managing, displaying, identifying and recording steps are implemented by the computer.

9. An apparatus, comprising:
- a computer implemented system for management of accounts payable and/or accounts receivable auditing data comprising a module for managing accounts payable and/or account receivable data of a client, the accounts payable and/or account receivable data including at least one line item; and
- an OCR system, in communication with said system for management of accounts payable and/or accounts receivable auditing data, said OCR system configured to receive a document comprising a plurality of different tags in a first portion thereof;
- wherein said OCR system identifies a plurality of said tags and compares said identified tags to supplier data stored in a database to validate said document;
- wherein said OCR system is configured to clip a portion of the document that corresponds to a line item and to place said clipped portion in said database;
- wherein said OCR system is configured to collect and associate all corresponding clipped portions with their originating line items;
- wherein said OCR system is configured to identify any tables in said document, automatically read column headers in said tables, and compare said column headers to headers in a table master;
- wherein said OCR system is configured to scan through an entirety of said document, place all targeted line items into said database, and mark said line items on a document within a GUI;
- wherein said OCR system is configured to tag a location of each targeted line back to its original location in said document; and
- wherein said line items are sent to said GUI, supported by link to an originating document and links to a corresponding clipped portion of said document.

10. The apparatus of claim 9, further comprising modules for:
- displaying an aged line item from among the at least one line item, wherein the at least one line item relates to a request from a vendor for payment on an account for the client;
- identifying credit data among the at least one displayed aged line item, wherein the credit data relates to a deduction that the client can take against the requested payment; and
- recording the identified credit data, wherein one or more of the managing, displaying, identifying and recording steps are implemented by the computer.

11. An apparatus, comprising: an OCR system, in communication with a system for management of accounts payable and/or accounts receivable auditing data, said OCR system configured to receive a document comprising a plurality of different tags in a first portion thereof, wherein said document first portion comprises a document cover sheet;
- wherein said OCR system identifies a plurality of said tags and compares said identified tags to supplier data stored in a database to validate said document;
- wherein said OCR system recognizes at least the identity of a supplier and the identity of a client to which the document should be routed;
- wherein said OCR system routes said document at least to said client to which said document should be routed; and
- wherein said OCR system is configured to clip a portion of the document that corresponds to a line item and to place said clipped portion in a database;
- wherein said OCR system is configured to collect and associate all corresponding clipped portions with their originating line items;
- wherein said OCR system is configured to identify any tables in said document, automatically read column headers in said tables, and compare said column headers to headers in a table master;
- wherein said OCR system is configured to scan through an entirety of said document, place all targeted line items into said database, and mark said line items on a document within a GUI;
- wherein said OCR system is configured to tag a location of each targeted line back to its original location in said document; and
- wherein said line items are sent to said GUI, supported by link to an originating document and links to a corresponding clipped portion of said document.

12. An apparatus, comprising:
- an OCR system, in communication with a system for management of accounts payable auditing data, said OCR system configured to receive a document; and
- wherein said OCR system is configured to clip a portion of the document that corresponds to a line item and to place said clipped portion in a database, said clipped portion comprising a regional sub-image of said document that corresponds to said line item, wherein said clipped portion is associated to said line item;

wherein said OCR system is configured to collect and associate all corresponding clipped portions with their originating line items;

wherein said OCR system is configured to identify any tables in said document, automatically read column headers in said tables, and compare said column headers to headers in a table master;

wherein said OCR system is configured to scan through an entirety of said document, place all targeted line items into said database, and mark said line items on a document within a GUI;

wherein said OCR system is configured to tag a location of each targeted line back to its original location in said document; and wherein said line items are sent to said GUI, supported by link to an originating document and links to a corresponding clipped portion of said document.

13. A computer implemented method, comprising the steps of:

providing an OCR system, in communication with a system for management of accounts payable and/or accounts receivable auditing data, said OCR system configured to receive a document comprising a plurality of different tags in a first portion thereof, wherein said document first portion comprises a document cover sheet;

said OCR system identifying a plurality of said tags and comparing said identified tags to supplier data stored in a database to validate said document;

said OCR system recognizing at least the identity of a supplier and the identity of a client to which the document should be routed;

said OCR system routing said document at least to said client to which said document should be routed; and said OCR system clipping a portion of the document that corresponds to a line item and placing said clipped portion in a database;

wherein said OCR system is configured to collect and associate all corresponding clipped portions with their originating line items;

wherein said OCR system is configured to identify any tables in said document, automatically read column headers in said tables, and compare said column headers to headers in a table master;

wherein said OCR system is configured to scan through an entirety of said document, place all targeted line items into said database, and mark said line items on a document within a GUI;

wherein said OCR system is configured to tag a location of each targeted line back to its original location in said document; and wherein said line items are sent to said GUI, supported by link to an originating document and links to a corresponding clipped portion of said document.

14. The apparatus of any of claims 1 and 9:

wherein said document first portion comprises a document cover sheet;

wherein said OCR system recognizes at least the identity of a supplier and the identity of a client to which the document should be routed; and wherein said OCR system routes said document at least to said client to which said document should be routed.

\* \* \* \* \*